(12) United States Patent
Kopylovitz

(10) Patent No.: US 8,589,726 B2
(45) Date of Patent: Nov. 19, 2013

(54) SYSTEM AND METHOD FOR UNCOVERING DATA ERRORS

(75) Inventor: Haim Kopylovitz, Herzliya (IL)

(73) Assignee: Infinidat Ltd., Herzliya (IL)

( * ) Notice: Subject to any disclaimer, the term of this patent is extended or adjusted under 35 U.S.C. 154(b) by 270 days.

(21) Appl. No.: 13/223,742

(22) Filed: Sep. 1, 2011

(65) Prior Publication Data

US 2013/0061087 A1    Mar. 7, 2013

(51) Int. Cl.
*G06F 11/00*    (2006.01)

(52) U.S. Cl.
USPC .......................................................... 714/6.3

(58) Field of Classification Search
USPC .......................................................... 714/6.3
See application file for complete search history.

(56) References Cited

U.S. PATENT DOCUMENTS

| | | | |
|---|---|---|---|
| 5,265,230 A * | 11/1993 | Saldanha et al. | 711/161 |
| 5,978,952 A | 11/1999 | Hayek et al. | |
| 6,101,614 A | 8/2000 | Gonzales et al. | |
| 6,349,390 B1 | 2/2002 | Dell et al. | |
| 6,389,573 B1 * | 5/2002 | Weng | 714/784 |
| 7,254,748 B1 | 8/2007 | Wright et al. | |
| 7,490,263 B2 | 2/2009 | King | |
| 7,788,541 B2 | 8/2010 | Shellhamer | |
| 2001/0042230 A1 * | 11/2001 | Williams et al. | 714/703 |
| 2003/0009721 A1 | 1/2003 | Hsu et al. | |
| 2004/0168102 A1 * | 8/2004 | Tsunoda | 714/6 |
| 2004/0190357 A1 * | 9/2004 | Scheuerlein et al. | 365/222 |
| 2007/0094569 A1 | 4/2007 | Thayer et al. | |
| 2007/0174682 A1 | 7/2007 | King | |
| 2009/0043951 A1 * | 2/2009 | Shalvi et al. | 711/103 |
| 2009/0259882 A1 | 10/2009 | Shellhamer | |
| 2009/0319843 A1 * | 12/2009 | Meir et al. | 714/746 |
| 2012/0144267 A1 * | 6/2012 | Yeh et al. | 714/763 |
| 2012/0260148 A1 * | 10/2012 | Hughes et al. | 714/773 |

* cited by examiner

*Primary Examiner* — Michael Maskulinski
*Assistant Examiner* — Neil Miles
(74) *Attorney, Agent, or Firm* — Wiggin and Dana LLP; Gregory S. Rosenblatt

(57) ABSTRACT

According to the presently disclosed subject matter there is provided inter alia, a method and system which enable to uncover errors which are correctible by a data integrity mechanism in a computer system. The same data is read with the help of two different types of read commands. The first command is a read command which does not implement an inherent ECC and therefore does not correct corrupted data. The second command is a read command which includes an ECC and is adapted to correct errors which are detected in the data which is being read. The data obtained by each of the two read commands is compared, and in cases where a difference is identified between the two data, it is determined that an error has been detected and corrected by the ECC.

19 Claims, 3 Drawing Sheets

SYSTEM AND METHOD FOR UNCOVERING DATA ERRORS

FIELD OF THE PRESENTLY DISCLOSED SUBJECT MATTER

This invention relates to the field of data integrity maintenance mechanisms.

BACKGROUND

One common mechanism for maintaining data integrity is Error correction code (ECC). Error correction code is adapted to detect errors in stored data and to reconstruct the original error-free data. The number of corrupted bits which can be detected and/or corrected depend on the specific error scheme which is being used.

Typically, an error correction code includes the appending of a number of bits (check bits) according to some type of predefined algorithm, to a block of data of a predefined size. Following a Read or Write operation, the check bits can be used along with corresponding functions for detecting corrupted data within the block of data. In cases where no error is detected, an OK status is returned. Otherwise, depending on the specific error correction scheme, one or more bit-errors can be corrected. In some cases, error correction codes are implemented as an inherent mechanism of the communication protocols, such as in SCSI and SATA communication protocols.

Another mechanism for data integrity monitoring and maintenance is data scrubbing. In general the term "data scrubbing" may refer to any kind of attempt to ensure the readability of the data stored on a storage device. Data scrubbing may include for example a deliberate attempt to read data in order to obtain a retuned status reporting whether the read attempt was successful or not. While information in respect of the readability of the data is obtained, the integrity of the data is not necessarily confirmed and the data itself is potentially corrupted, even if its read request was successful.

Data scrubbing may also include some type of data correction mechanism. For example, after data is read from a data storage device, it can be checked for errors and in cases where corrupted data is detected, it can be connected with the help of an ECC or a mirrored version of the data.

In some cases data scrubbing can operate as a background process that is adapted to systematically read stored data from one or more data storage devices in a storage system, inspect the stored data for errors and optionally connect detected errors with the help of an ECC or mirrored data.

Data scrubbing therefore enables to continuously connect single, and in some cases multiple bit-errors, and thereby avoid accumulation of errors which many times cannot be connected once they are accumulated. In large storage systems, which comprise a considerable number of disks, often a great deal of the stored data is not accessed by hosts for long periods of time, and thus it becomes particularly important to execute data scrubbing in order to ensure the integrity of the unread data, avoid accumulation of errors over time, and provide error-free data once it is accessed.

Published references considered to be relevant as background to the presently disclosed subject matter are listed below. Acknowledgement of the references herein is not to be inferred as meaning that these are in any way relevant to the patentability of the presently disclosed subject matter.

U.S. Pat. No. 6,349,390 discloses a memory module for attachment to a computer system having a memory bus and a method of using the memory module for error correction by scrubbing soft errors on-board the module. The module includes a printed circuit card with memory storage chips on the card to store data bits and associated ECC check bits. Tabs are provided on the circuit card to couple the card to the memory bus of the computer system. Logic circuitry selectively operatively connects and disconnects the memory chip and the memory bus. A signal processor is connected in circuit relationship with the memory chips. The logic circuitry selectively permits the signal processor to read the stored data bits and associated check bits from the memory chips, recalculate the check bits from the read stored data bits, compare the recalculated check bits with the stored check bits, correct all at least one bit errors in the store data bits and stored associated check bits and re-store the correct data bits and associated check bits in the memory chips. When the memory chips and the memory bus are disconnected, single bit soft errors occurring during storage of the data bits and check bits are corrected periodically before the data is read from the memory chips to the data bus on a read operation.

U.S. Pat. No. 7,788,541 discloses a RAID controller and uses a method to identify a storage device of a redundant array of storage devices that returns corrupt data to the RAID controller. The method includes reading data from a location of each storage device in the redundant array a first time, and detecting that at least one storage device returned corrupt data. In response to detecting corrupt data, steps are performed for each storage device in the redundant array. The steps include reading data from the location of the storage device a second time without writing to the location in between the first and second reads, comparing the data read the first and second times, and identifying the storage device as a failing storage device if the compared data has a miscompare. Finally, the method includes updating the location of each storage device to a new location and repeating the steps for the new location.

U.S. Pat. No. 7,490,263 discloses an apparatus, system, and method for a storage device's enforcing write recovery of erroneous data. The storage device enforces write recovery leading to a reassignment and re-write for the defective data block by the storage controller at a subsequent write opportunity with a usual write without verify command. The invention enables the storage device to identify, and re-discover the defect by automatically verifying the data written, and report an unrecovered write error to the storage controller on said write command, causing said write recovery to occur.

SUMMARY

According to a first aspect of the presently disclosed subject matter there is provided a method of uncovering corrupted data in a physical storage space of a storage system, the corrupted data being correctable by an error correction code (ECC), the method comprising: executing a first read command in respect of a given data unit, the first read command being adapted to return a first data corresponding to the given data unit without correcting corrupted data in the first data; executing a second read command in respect of the given data unit, the second read command being adapted to utilize an ECC to check for corrupted data in a second data corresponding to the given data unit and if detected to correct the corrupted data and return the second data with corrected corrupted data; determining a location of the corrected corrupted data in the physical storage space, wherein the location is determined in accordance with discrepancy between the first data and the second data, to yield one or more uncovered errors.

According to another aspect of the presently disclosed subject matter there is provided a computer system operatively connected to one or more physical storage devices controlled by a plurality of storage control devices, comprising an error processing module being operable to: execute a first read command in respect of a given data unit, the first read command being adapted to return a first data corresponding to the given data unit without correcting corrupted data in the first data; execute a second read command in respect of the given data unit, the second read command being adapted to utilize an ECC to check for corrupted data in a second data corresponding to the given data unit and if detected to correct the corrupted data and return the second data with corrected corrupted data; determine a location of the corrected corrupted data in the physical storage space, wherein the location is determined in accordance with discrepancy between the first data and the second data, to yield one or more uncovered errors.

According to another aspect of the presently disclosed subject matter there is provided an error processing module operatively connected to one or more physical storage devices, the error processing module being operable to: execute a first read command in respect of a given data unit, the first read command being adapted to return a first data corresponding to the given data unit without correcting corrupted data in the first data; execute a second read command in respect of the given data unit, the second read command being adapted to utilize an ECC to check for corrupted data in a second data corresponding to the given data unit and if detected to correct the corrupted data and return the second data with corrected corrupted data; determine a location of the corrected corrupted data in the physical storage space, wherein the location is determined in accordance with discrepancy between the first data and the second data, to yield one or more uncovered errors.

According to yet another aspect of the presently disclosed subject matter there is provided a program storage device readable by machine, tangibly embodying a program of instructions executable by the machine to perform method steps of uncovering errors in a physical storage space of a storage system, the errors being correctable by an error correction code (ECC), the method comprising: executing a first read command in respect of a given data unit, the first read command being adapted to return a first data corresponding to the given data unit without correcting corrupted data in the first data; executing a second read command in respect of the given data unit, the second read command being adapted to utilize an ECC to check for corrupted data in a second data corresponding to the given data unit and if detected to correct the corrupted data and return the second data with corrected corrupted data; determining a location of the corrected corrupted data in the physical storage space, wherein the location is determined in accordance with discrepancy between the first data and the second data, to yield one or more uncovered errors.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
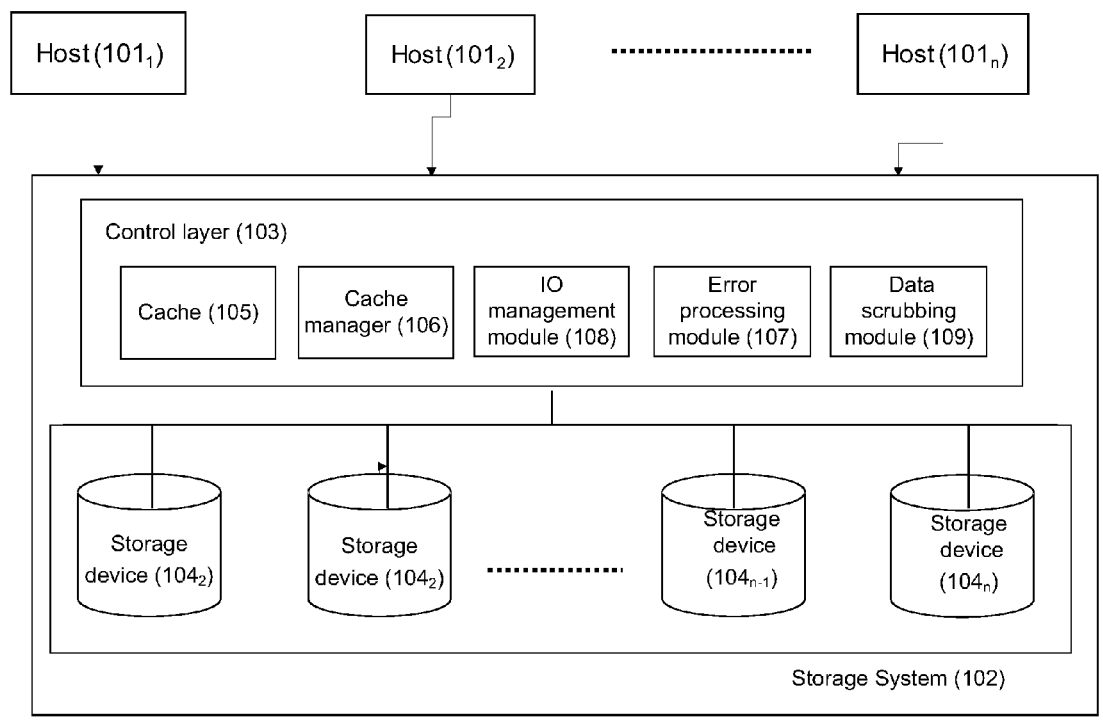
FIG. 1 is a functional block diagram schematically illustrating a recording system-architecture, according to the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "executing", "determining", "collecting", "receiving", "reallocating" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
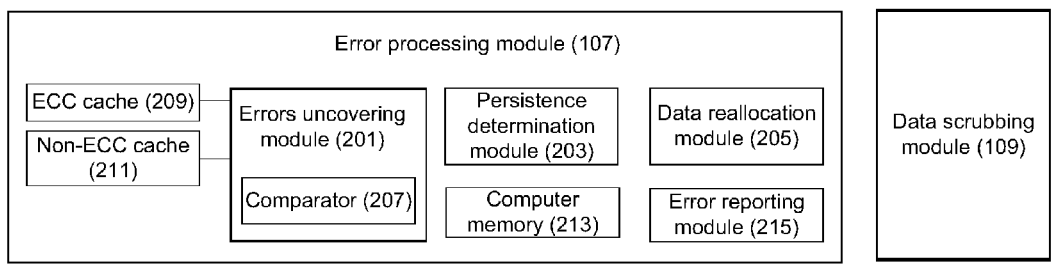
FIG. 2 is a functional block diagram schematically illustrating a more detailed view of an error processing module, according to the presently disclosed subject matter.
Figure 3:
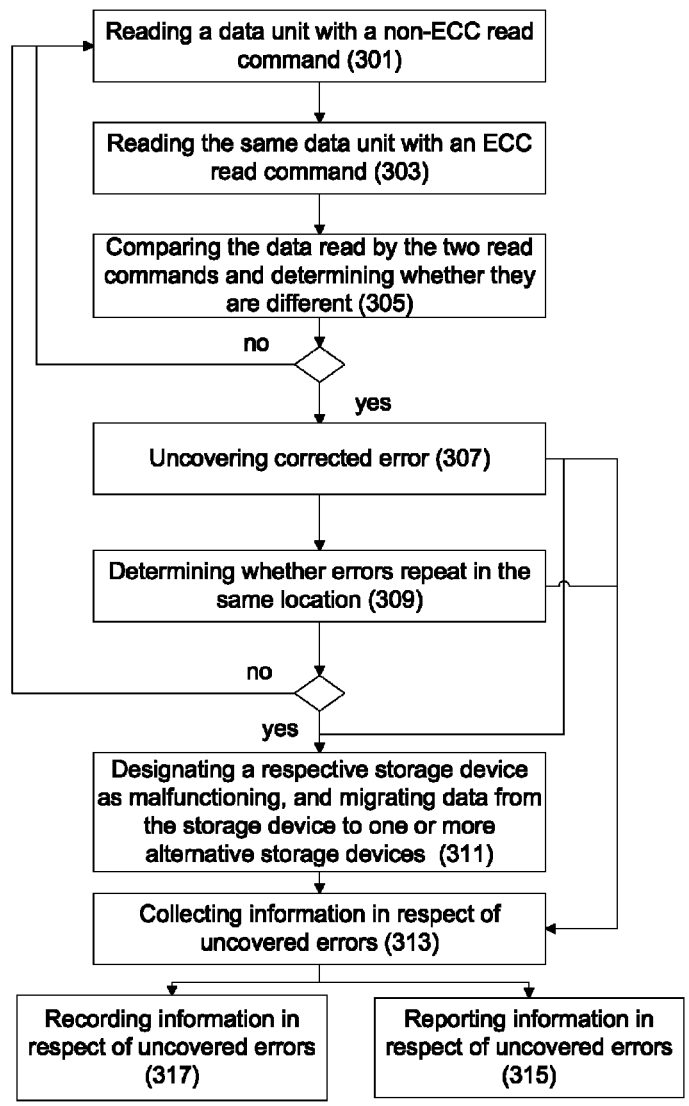
FIG. 3 is a flowchart showing principle operations carried out, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1 and 2 illustrate a general schematic of the system architecture in accordance with an embodiment of the presently disclosed subject matter. Each module in FIGS. 1 and 2 can be made up of any combination of software, hardware and/or firmware that performs the functions as defined and explained herein. The modules in FIGS. 1 and 2 may be centralized in one location or dispersed over more than one location. In other embodiments of the presently disclosed subject matter, the system may comprise fewer, more, and/or different modules than those shown in FIGS. 1 and 2.

While in some cases in order to maintain data integrity it is sufficient to utilize some type of error correction mechanism (e.g. ECC, minoring) to detect and correct errors and then rewrite the corrected data to the same location on the computer storage device, in other cases where data errors are caused by a malfunctioning or damaged storage media, the errors are likely to be persistent and repeatedly occur in different places on the storage device (e.g. disk).

The occurrences of multiple errors on a storage device introduce a risk of accumulation of a large number of corrupted bits which cannot be corrected by an ECC. Furthermore, repeated occurrences of errors in a storage device (e.g. disk) may indicate that the storage device is malfunctioning and therefore should be replaced. In such cases, instead of repeatedly correcting errors it is advantageous to replace the media itself and copy the data to an alternative storage device (e.g. different disk).

In order to detect repeating occurrences of errors in a given disk, information in respect of such an error is needed. Such information can be recorded and used to determine whether the number of errors which occurred in a given disk is greater than a predefined threshold and accordingly merits replacement of the disk.

However, some communication protocols implementing a data integrity mechanism which includes some type of an ECC, report the detection of errors only in cases where the error correction fails, and remain silent in respect of corrected errors. This is the case for example in a SATA communication protocol. Therefore, the occurrence of corrected errors is not reported and thus remains hidden. As the corrected errors are not reported, they cannot be used in order to indicate that replacement of the disk is required.

According to the presently disclosed subject matter there is provided inter alia, a method and system which enable to uncover errors which are correctible by a data integrity mechanism in a computer system. Statistical information in respect of such errors can be collected and used to identify locations in a storage system, which encounter repeating errors. As repeating errors may be indicative of malfunctioning storage media, in cases where multiple errors are detected in the same storage media, the storage media can be designated as a malfunctioning media and the data stored on the storage media can be reallocated to an alternative storage media. Once the stored media is migrated to an alternative location, the malfunction disk can be shut off and replaced.

The presently disclosed subject matter is directed to any type of computer system being associated with a storage device of some type (e.g. hard drive, tape drive, flash memory etc.) and comprising a storage controller adapted, inter alia, to control and manage I/O operations and configured to uncover correctible data errors. The computer system can be, but is not limited to, a personal computer, a portable computer, a server computer etc. A storage controller can be, for example, a small computer system interface (SCSI) host bus adapter (HBA).

Turning now to FIG. 1, which shows a functional block diagram schematically illustrating a recording system-architecture, according to the presently disclosed subject matter. FIG. 1 shows one or more host computers $101_{1-n}$ (workstations, application servers, etc.) illustrated as sharing common storage means provided by a virtualized storage system 102. A host ($101_{1-n}$) can be for example an external server, a group of servers, a port in server, a laptop or personal computer etc.

The storage system comprises a storage control layer 103 comprising one or more appropriate storage control devices operatively coupled to the plurality of host computers $101_{1-n}$ and to a plurality of data storage devices $104_{1-n}$ constituting a physical storage space optionally distributed over one or more storage nodes, wherein the storage control layer 103 is operable to control input/output (I/O) operations between hosts $101_{1-n}$ and data storage devices $104_{1-n}$. Connection between host computers $101_{1-n}$ and storage system 102 can be a direct connection and/or it may be established over a communication network. Data storage devices $104_{1-n}$ are adapted for storing a plurality of data units. Control layer 103 can also comprise or is otherwise associated with one or more processors configured, inter alia, to manage and control relevant components and operations, and to perform tasks in response to instructions.

The storage control layer 103 is further operable to handle a virtual representation of physical storage space and to facilitate necessary mapping between the physical storage space and its virtual representation (i.e. a logical storage space). Control layer 103 is configured to create and manage at least one virtualization layer interfacing between elements of the computer system (host computers, etc.) external to the storage system and the physical storage space.

The virtualization functions may be provided in hardware, software, firmware or any suitable combination thereof. Optionally, the functions of control layer 103 (and more specifically the functions of processing module 107 and/or scrubbing module 109 described below) may be fully or partly integrated with one or more host computers and/or storage devices and/or with one or more communication devices enabling communication between the hosts and the storage devices. Optionally, a format of logical representation provided by control layer 103 may differ, depending on interfacing applications.

The physical storage space may comprise any appropriate permanent storage medium and may include, by way of non-limiting example, one or more disk units (DUs), also called "disk enclosures", comprising several disk drives (disks). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. By way of non-limiting example, $DD_{id}$ may represent a serial number internally assigned to the disk drive by the system or, alternatively, a WWN or universal serial number assigned to the disk drive by a vendor or manufacturer. The storage control layer 103 and storage devices $104_{1-n}$ may communicate with host computers $101_{1-n}$ and within the storage system in accordance with any appropriate storage protocol.

Data stored in the physical storage space, may be logically represented to a client (host) in terms of logical objects within a logical storage space. Depending on the storage protocol, the logical objects may be logical volumes, data files, multimedia files, snapshots and other copies, etc.

A logical volume (LV) represents a plurality of data blocks characterized by successive Logical Block Addresses (LBA) ranging from 0 to a number LUK. Different logical volumes may comprise different numbers of data blocks, which are typically of equal size within a given system (e.g. 512 bytes). The entire address space of the storage system is divided into logical volumes, and each logical volume becomes an addressable device.

In accordance with the presently disclosed subject matter, control layer 103 can comprise for example a cache memory 105, cache manager 106 an IO management module 108 and an error processing module 107.

IO management module 108 is configured to handle read and write request operations, for example in response to requests issued by a host. IO operations can be completed with the help of cache memory 105 and cache manager 106. Error processing module 107 is configured inter alia, to enable detection of unreported corrected errors and perform advanced data scrubbing as described below in more detail.

Certain embodiments of the presently disclosed subject matter are applicable to the storage architecture of a computer system described with reference to FIG. 1. However, the invention is not bound by the specific architecture; equivalent and/or modified functionality can be consolidated or divided in another manner and can be implemented in any appropriate combination of software, firmware and hardware. Those versed in the art will readily appreciate that the invention is, likewise, applicable to storage architecture implemented as a virtualized storage system. In different embodiments of the presently disclosed subject matter the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

FIG. 2 is a functional block diagram schematically illustrating a more detailed view of error processing module 107, according to the presently disclosed subject matter. As disclosed in FIG. 2 error processing module 107 can comprise an error uncovering module 201, a persistence determination module 203 and a reallocation module 205.

Error processing module 107 is configured to enable uncovering data errors which are corrected by an ECC. To this end, error uncovering module 201 is configured to read the same data unit (characterized by a given LBA range) with the help of two different types of read commands. The first command is a read command which does not implement an inherent ECC (referred to herein as a "non-ECC read command") and therefore does not correct corrupted data. The second command is a read command which includes an ECC (referred to herein as an "ECC read command") and is adapted to correct corrupted data which is detected in the data which is being read. Such read commands are supported for example, by SCSI and SATA drives.

The size of the data which is read in a read-command may vary depending on the specific configuration of the storage system and the communication protocol which is used. As mentioned above, data is characterized by a range of Logical Block Addresses (LBA) corresponding to a respective physical location of the data blocks on the storage devices $104_{1-n}$. In the following discussion the term "data unit" is used as a general expression to include different sizes of data. A data unit, can refer, for example, to a data block of 512 or 520 bytes. Alternatively, a data unit can refer to a predefined number of logically successive data blocks.

Consider for example that a data unit has a one bit error, the data unit which is retrieved by an ECC read command would undergo an error correction process and would be therefore error-free. On the other hand, the data unit which is retrieved by a non-ECC read command would not undergo an error correction process and therefore would include the corrupted bit. Error uncovering module 201 can comprise or be otherwise associated with a computer memory for storing the data which is read by each of the two read commands. Computer memory can include for example, ECC cache 209 for storing data read by an ECC read command, and non-ECC cache 211 for storing data read by a non-ECC read command.

Comparator 207 in error uncovering module 201 is configured to compare between data units obtained by each of the two read commands, which are now stored in the computer memory. In cases where a difference is identified between the data which is read by each of the different read commands, error uncovering module 201 can determine that an error has been detected and corrected by the ECC. This enables to uncover data errors which are corrected by an ECC and which otherwise may not have been reported once corrected.

Furthermore, as each data unit is characterized by a range of logical block addresses which corresponds to a respective physical location on the storage device, this can serve to indicate a physical location of potentially malfunctioning storage media (e.g. disk). To this end, persistence determination module 203 is configured to determine whether uncovered errors are repeatedly detected in the same location corresponding to a storage device (e.g. disk). In cases where it is determined that the number of errors which occurred on the same storage device exceed a predefined error-number threshold, error processing module 107 can be configured to reallocate the data to a different location within the physical storage space. This can be accomplished with the help of reallocation module 205 which is configured to reallocate the data to a different storage device within the physical storage space, for example to a different disk. Accordingly, the presently disclosed subject matter enables to identify a malfunctioning disk and enables its replacement, thereby assisting data integrity maintenance.

Error processing module 107 can be operated as part of an advanced scrubbing process. To this end control layer 103 further comprises a data scrubbing module 109 which can be configured for example, to execute a background process adapted to systematically read the data from data storage devices $104_{1-n}$, identify data errors and correct and rewrite the corrected data back to storage devices $104_{1-n}$. According to the presently disclosed subject matter, data scrubbing module 109 is associated with error processing module 107 wherein the data is read during the scrubbing process with the help of error processing module 107. This enables to uncover during the scrubbing process, corrected errors and their respective location within the physical storage space. It also enables to determine whether errors repeatedly occur in one or more storage devices and in case they do, reallocate the respective data to an alternative location (storage device) within the physical storage space.

FIG. 3 is a flowchart showing principle operations carried out, in accordance with the presently disclosed subject matter. The operations described with reference to FIG. 3 can be performed by control layer 103 with the help of error processing module 107.

At block 301 a data unit is read from a storage device with the help of a read command which enables to return uncorrected data (non-ECC read command). For example a Read Long command which is available in SATA and SCSI communication protocols is a read command which enables to define whether or not to correct any errors found before returning the data. A Long read command can be configured to be ECC-enabled in which case it operates as an ECC read command, or it can be configured to be ECC-disabled in which case it operates as a non-ECC read command. Accordingly, in cases where the data unit which is being read is corrupted, the uncorrected data can be retrieved using the Read Long command which is ECC-disabled.

The same data unit (characterized by the same range of LBA) is then read using a read command which includes an ECC i.e. ECC read command (block 303). For example, some read commands which are available in SCSI and SATA protocols include ECC (e.g. a Read command). Alternatively, a Read Long command which is ECC-enabled can be used. Accordingly, assuming that the data unit which is being read is corrupted and one or more errors are detected and corrected by the ECC, the retrieved data would be error-free. Note that the data is first read with a non-ECC read command to enable reading the data in its uncorrected form, before it is corrected by the ECC.

In order to enable a plausible comparison between the data from the two read commands, the data which is provided by each of the read commands must be in the same format. As some read commands return a modified version of the data, it is essential to ensure that the data which is returned by the ECC read command and the non-ECC read command are in the same format. For example, in some cases the data which is returned by a SATA Long read command is modified into a format which is different than the format of same data returned by a SATA Read command. In such cases, in order to obtain corrected and uncorrected data in the same format, an ECC-enabled Long Read command can be used in order to obtain corrected data and an ECC-disabled Long Read command can be used in order to obtain uncorrected data.

The data which is read by the two read commands is compared (e.g. with the help of comparator 207) and it is determined whether a difference exists between the two data units (block 305). In cases where no difference is identified, this indicates that no errors were corrected and the process can proceed to check other data units in the storage system. Otherwise, in cases where a difference is identified, this indicates that an error has occurred and has been corrected by an ECC (307).

As explained above, a data unit is defined by a range of LBAs which can comprise one or more blocks of a predefined size. Comparison between the two data units can be performed for example bit by bit. This type of comparison would enable to identify the location of corrupted bits within the data unit.

Information in respect of uncovered errors can also be collected in order to obtain historical and statistical information in respect of the errors which were uncovered in different locations (block 313). For example, information in respect of errors which were uncovered in different disks can be collected. This information can be recorded for example in a dedicated non-volatile computer memory 213 being integrated within, or otherwise associated with error processing module 107 (block 317).

Information in respect of an uncovered error which is made available in accordance with the teachings disclosed herein can be reported along with the read data (block 315). This information can be made available for example to a user of a host computer or a system administrator in the form of error alerts. Reporting of uncovered errors can be accomplished with the help of error reporting module 215.

The information which is recorded in respect of uncovered errors can be used in order to identify a malfunctioning storage device and to determine whether to reallocate the data from the malfunction device to an alternative one and replace the storage device. In order to determine whether reallocation of the data from the current storage device to an alternative storage device is warranted, it is first determined whether errors repeatedly occur in the same location on the storage device e.g. on the same disk (block 309).

To this end, once a corrected error is uncovered the and recorded, the recorded information in respect of previous uncovered errors (e.g. stored in computer memory 213) can be accessed and used to determine whether other errors occurred in the past, in the same storage device. In cases where it is determined that other errors have occurred, the storage device can be identified as a malfunctioning storage device and designated to be replaced (block 311). Once a disk is designated to be replaced, the data which is stored on the disk can be migrated to an alternative one or more locations in one or more respective disks within the storage space.

Replacement of a disk in a storage system can be implemented by a "phase out" or a "graceful shut down" procedure, which are well known in the art. In these procedures the data which is stored on the malfunctioning disks is gradually migrated to other disks within the storage space, while an allocation table used for mapping information in the storage system is continuously updated as the migration process proceeds. Requests directed at data that has not yet been migrated from the malfunctioning disk is serviced from the malfunctioning disk. Only when all data has been migrated from the malfunctioning disk, it is shut off and can be physically removed and replaced. Data reallocation module 205 can be configured to execute migration of data in accordance with the principle of a phase out procedure.

Decision to commence migration of the data to an alternative storage device can depend, for example, on the number of errors recorded in the same storage device. If the number of recorded errors identified in the same storage device exceed a certain threshold, the data unit is reallocated to an alternative storage device. In case it is determined that the number of errors does not exceed the threshold (e.g. it is the first time an error is recorded in the indicated disk) the data is not reallocated from its current location. The process can proceed to check other data units stored within the physical storage space. Information in respect of migrated data can be collected (block 313) and recorded in a dedicated computer memory (e.g. computer memory 213). Information in respect of migrated data can be also reported (block 315) for example to a user of a host computer or a system administrator.

In addition to the number of errors which occurred in a storage device, the frequency of such errors can also be used in order to determine whether the storage device is suspected of malfunctioning. Accordingly, if a given number of errors are uncovered over a short period of time it would give a stronger indication of a malfunctioning storage device than in cases where the same number of errors occur over a longer period of time. Thus, in some cases the decision whether to designate a storage device as malfunctioning and migrate data from the storage device to an alternative storage device, (and shutdown the malfunctioning storage device) is based on information in respect of both the number of errors which occurred in a given storage device, and the period of time over which these errors occurred.

Furthermore, the location of the error within the disk may also be considered. For example, in some cases if all errors are located within a small confined area on the disk, even if the number of errors is greater than the threshold, the disk may not be designated as malfunctioning. Instead, only the area comprising the errors is identified as malfunctioning, and only the data which is located in that area is migrated to an alternative location, on the disk or onto an alternative disk.

In addition to the above, error reporting module 215 can be configured to provide different historical and statistical information based on the information which is collected and stored (e.g. in computer memory 213). For example, error reporting module 215 can provide information indicating that data has been migrated from one storage device to another. Error reporting module 215 can also provide statistical information specifying the number of errors which were uncovered in each storage device and the number of disks which were designated as malfunctioning disks.

According to one scenario, the operations illustrated above with reference to FIG. 3 can be executed as part of an advanced data scrubbing process (e.g. with the help of scrubbing module 109). During advanced data scrubbing, data units are systematically read from the storage devices associated with a computer system, and the operations described above with reference to FIG. 3 are repeatedly executed for all or part of the data units storage within the physical storage space. Thus, an advanced data scrubbing process, as disclosed herein, enables in addition to correcting corrupted data, to uncover data errors which are corrected by an ECC and report such errors. The advanced data scrubbing process disclosed herein further enables to use the information in respect of uncovered errors to identify malfunctioning storage devices, and if necessary, migrate the corrected data to an alternative one or more storage devices and facilitate the replacement of the malfunctioning disk.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A method of uncovering corrupted data in a physical storage space of a storage system, said corrupted data being correctable by an error correction code (ECC), the method comprising:
   executing a first read command in respect of a given data unit with the ECC disabled so that the first read command returns a first data in an uncorrected form;
   subsequent to the first read command, executing a second read command in respect of said given data unit, the second read command being adapted to utilize an ECC to check for corrupted data and to return a second data in an error-free form;
   determining whether a difference exists between the first data and the second data, said difference being indicative of at least one corrected error in said given data unit; and
   determining that at least part of non-transitory storage media that store said data unit is suspected as malfunctioning, in response to at least said difference.

2. The method according to claim 1 further comprising collecting statistical information in respect of errors which occurred in one or more locations in the physical storage space said statistical information being indicative of one or more potentially damaged storage devices in said physical storage space.

3. The method according to claim 2 wherein said statistical information includes at least a number of errors which occurred in at least one storage device in said physical storage space, the method further comprising:
   receiving statistical information in respect of errors which occurred in said storage device;
   determining whether the number of errors is greater than a predefined threshold; and
   in case it is, designating the storage device as a malfunctioning storage device that should be replaced and reallocating data in said storage device to an alternative one or more storage devices in the physical storage space.

4. The method according to claim 3 wherein said reallocation is performed by a phase out procedure.

5. The method according to claim 1 further comprising operating a background process and systematically repeating the method steps for a plurality of data units within said physical storage space thereby enabling to identify locations of corrected corrupted data in said physical storage space.

6. The method according to claim 1 further comprising reporting said one or more uncovered errors.

7. The method according to claim 4, operating a background process and systematically repeating the method steps for a plurality of data units within said physical storage space thereby enabling to identify malfunctioning storage devices in said physical storage space.

8. The method according to claim 1 wherein said one or more errors are not reported by said ECC.

9. The method according to claim 1 wherein said first read command is an ECC disabled Long read command and said second read command is an ECC enabled Long read command.

10. The method according to claim 1 wherein said given data unit comprises one or more data blocks of predefined size.

11. A computer system operatively connected to one or more physical storage devices controlled by a plurality of storage control devices, comprising an error processing module being operable to:
   execute a first read command in respect of a given data unit with the ECC disabled so that the first read command returns a first data in an uncorrected form;
   subsequent to the first read command, execute a second read command in respect of said given data unit, the second read command being adapted to utilize an ECC to check for corrupted data and return a second data in an error-free form;
   determining whether a difference exists between the first data and the second data, said difference being indicative of at least one corrected error in said given data unit; and
   determining that at least part of non-transitory storage media that store said data unit is suspected as malfunctioning, in response to at least said difference.

12. The computer system according to claim 11 wherein said error processing module is associated with a computer memory and is further configured to collect statistical information in respect of errors in one or more locations in the physical storage space and store said statistical information in said computer memory, said statistical information being indicative of one or more potentially malfunctioning storage devices.

13. The computer system according to claim 12 wherein said statistical information includes at least a number of errors which occurred in at least one storage device in said physical storage space, the error processing module being further configured to:
   receive statistical information in respect of errors which occurred in said storage device;

determine whether the number of errors is greater than a predefined threshold; and in case it is, designate the storage device as a malfunctioning storage device that should be replaced and reallocate data in said storage device to an alternative one or more storage devices in the physical storage space.

14. The computer system according to claim 13, wherein said error processing module is configured to reallocate the data in a phase out procedure.

15. The computer system according to claim 11 further comprising a data scrubbing module associated with said error processing module and configured to systematically inspect a plurality of data units within said physical storage space and utilize said error processing unit to uncover errors in said physical storage space, thereby enabling to identify location of corrected corrupted data in said physical storage space.

16. The computer system according to claim 13 further comprising a data scrubbing module associated with said error processing module and configured to systematically inspect a plurality of data units within said physical storage space and utilize said error processing unit to uncover errors in said storage space, thereby enabling to identify malfunctioning storage devices in said physical storage space.

17. The computer system according to claim 11 further comprising an error reporting module configured to report said one or more uncovered errors.

18. An error processing module operatively connected to one or more physical storage devices, said error processing module being operable to:

execute a first read command in respect of a given data unit with the ECC disabled so that the first read command returns a first data in an uncorrected form;

subsequent to the first read command, execute a second read command in respect of said given data unit, the second read command being adapted to utilize an ECC to check for corrupted data and return a second data in an error-free form;

determining whether a difference exists between the first data and the second data, said difference being indicative of at least one corrected error in said given data unit; and determining that at least part of non-transitory storage media that store said data unit is suspected as malfunctioning, in response to at least said difference.

19. A program storage device readable by machine, tangibly embodying a program of instructions executable by the machine to perform method steps of uncovering errors in a physical storage space of a storage system, said errors being correctable by an error correction code (ECC), the method comprising:

executing a first read command in respect of a given data unit with the ECC disabled so that the first read command returns a first data in an uncorrected form;

subsequent to the first read command, executing a second read command in respect of said given data unit, the second read command being adapted to utilize an ECC to check for corrupted data and to return a second data in an error-free form;

determining whether a difference exists between the first data and the second data, said difference being indicative of at least one corrected error in said given data unit; and determining that at least part of non-transitory storage media that store said data unit is suspected as malfunctioning, in response to at least said difference.

* * * * *